United States Patent [19]
Schmidt

[11] 4,272,919
[45] Jun. 16, 1981

[54] SEED CARRIER AND METHOD OF PRODUCING SAME

[76] Inventor: Evald G. Schmidt, Skansgatan 4, Markaryd, Sweden, 285 00

[21] Appl. No.: 63,142

[22] Filed: Aug. 2, 1979

[30] Foreign Application Priority Data

Jul. 28, 1978 [SE] Sweden ............................... 7808216

[51] Int. Cl.³ .............................................. A01G 31/00
[52] U.S. Cl. ................................................ 47/56; 47/9
[58] Field of Search ................................... 47/9, 56, 74

[56] References Cited

U.S. PATENT DOCUMENTS

| 1,978,102 | 10/1934 | Clapp | 47/56 X |
| 2,243,857 | 6/1941 | Fischer | 47/56 X |
| 3,102,364 | 9/1963 | Pullen | 47/74 |
| 3,125,294 | 3/1964 | Lill | 47/9 X |
| 3,914,901 | 10/1975 | Muldner | 47/56 |
| 4,190,981 | 3/1980 | Muldner | 47/56 |

FOREIGN PATENT DOCUMENTS

| 1557928 | 5/1970 | Fed. Rep. of Germany . | |
| 1582057 | 7/1970 | Fed. Rep. of Germany . | |
| 1582527 | 7/1970 | Fed. Rep. of Germany . | |
| 2150770 | 4/1973 | Fed. Rep. of Germany | 47/56 |
| 225225 | 2/1968 | Sweden . | |
| 1302211 | 1/1973 | United Kingdom . | |
| 1302328 | 1/1973 | United Kingdom . | |
| 1356833 | 6/1974 | United Kingdom . | |
| 1399822 | 7/1975 | United Kingdom . | |
| 1405125 | 9/1975 | United Kingdom . | |
| 1475994 | 6/1977 | United Kingdom . | |

*Primary Examiner*—Robert E. Bagwill
*Attorney, Agent, or Firm*—John J. Dennemeyer

[57] ABSTRACT

The present invention relates to seed carriers which are preferably in the form of seed-containing sheets to be laid out on the ground. The seed carriers are produced continuously on a large scale by the utilization of forming wire machines commonly used for papermaking. The seed carrier is formed in part of a peat material which is fibre-graded, in that colloids and small particles have been removed, and/or of a peat material having a degree of humidification of 1 to 3 according to von Post's scale, and in part of a fibre material interconnecting the peat fibres. The seed carrier according to the invention may be used for growing all kinds of crop, preferably in growing plants in dry districts, for instance desert areas, where it will form a cover which promotes the retention of moisture in the underlying soil.

23 Claims, 6 Drawing Figures

SEED CARRIER AND METHOD OF PRODUCING SAME

The present invention relates to a seed carrier comprising a peat support adapted to be produced in a machine comprising at least one rotating endless forming wire or belt, preferably in a machine of the type used for papermaking. The invention also relates to a method of producing such seed carriers.

It has been found inappropriate to produce seed carriers in forming wire machines or the like because use was made of conventional peat material whereby large amounts of energy were spent for drying the complete sheet to the extent required. Thus for example, the energy consumption will be about 50% higher when drying a seed carrying sheet consisting of conventional peat material than when drying a sheet of traditional cellulose pulp produced on the forming wire machine.

The use of conventional peat material in the production of seed carrying layers on wire machines has also not been possible due to environment problems which arise when large amounts of colloids and other small particles present in the peat material separate out and get into the white-water of the wire machine.

The present invention has for its object to eliminate this drawback and to provide a seed carrying sheet which can be produced economically on a large scale on conventional forming wire machines, preferably of the type employed for papermaking purposes. This object is substantially attained by providing a seed carrying sheet as described hereafter and as claimed in the appended claims. It is also an object of the invention to provide a particularly advantageous method of producing such a seed carrier.

The invention will be described in more detail hereinafter with reference to the accompanying drawings, in which.

Figure 6:
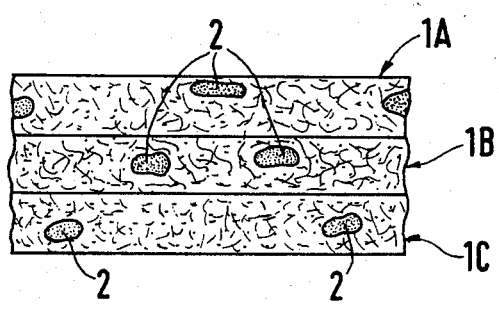
FIG. 6 illustrates a section through a seed carrier consisting of three layers with seeds embedded in each layer.

Referring to the drawing in more detail, the seed carrier 1 consists of a sheet comprising one layer 1A or a plurality of layers, for instance two layers 1A and 1B, seeds 2 being disposed between the layers 1A and 1B and/or embedded therein. The sheetlike seed carrier, alternatively, may consist of more than two layers, for instance of three layers 1A, 1B and 1C, as appears from FIG. 6. Seeds 2 may be incorporated in one or more of the seed carrying layers and/or between one or more of the seed carrying layers and the adjacent layer or layers.

As an alternative, seeds may be attached to the outer surface of the seed carrier by the use of an adhesive.

The seed carrier 1 comprises peat material which is fibre classified, or graded, in that colloids and particles less than about 0.2 mm have been separated out. This fibre classified peat material suitably consists of a material which has been subjected to a classifying operation comprising one grading step and at least one subsequent fine grading step, in which fine grading step the actual peat fibre concentration is less than about 1 percent by weight so as to separate out colloids and particles less than about 0.2 mm.

The higher the degree of humidification of the raw peat material, the more water should be added to obtain a lower peat fibre concentration. It will be seen from the table below which peat fibre concentration is aimed at by the addition of water at various degrees of humidification (H) of the raw peat material from the moor:

Degree of humidification (H), as measured on the moor: (according to von Post's scale)

Water is supplied by the water supplying plant to attain the following peat fibre concentration of the suspension:
0–3: max about 1% by weight
3–6: max about 0.75% by weight
6: max about 0.5% by weight The peat material suspension thus consistency controlled and having a peat fibre concentration of less than about 1% by weight, is fed via a conduit 10 to apparatus for separating therefrom colloids and particles less than about 0.2 mm. Such apparatus may comprise, for example, a screening member having through-flow apertures of about 1 mm or less in diameter.

The aperture size of the screening member of the apparatus is predetermined in relation to the consistency of the suspension and the degree of humidification of the peat material. The more humidified the peat contained in the suspension and the lower its consistency, the smaller the apertures of the screening member should be in order to obtain a maximum yield of accept material, i.e. as much easily drainable peat fibre material as possible.

From the Table following here below it is seen what yield an easily drainable peat fibre mass may obtain at various degrees of humidification, various peat fibre consistencies and various aperture or mesh sizes of the screening member of the apparatus:

| Degree of humidification (H) | Peat fibre consistency in % by weight | Aperture or mesh size of screening member, mm | Yield, in % |
| --- | --- | --- | --- |
| 0–3 | 0.75–1 | about 1 | about 90 |
| 3–6 | 0.5–0.75 | 0.5–1 | about 80–90 |
| 6 | 0.1–0.5 | max 0.5 | about 70–90 Fine-mesh sieve or cloth |

It is seen from the above Table that it is possible to obtain a very high yield (i.e. useful proportion of the finally prepared peat), independently of the degree of humidification of the peat moor, simply by supplying thereto a suitable amount of water to reach a suitable consistency of peat fibre, and by utilizing in the apparatus a screening member with a suitable aperture or mesh size.

By carrying out the process with the values as specified in the last mentioned table, a peat fibre consistency increase of at least 100 percent will be obtained in the apparatus, meaning that about 50 percent of the water supplied is removed, whereby also at least 50 percent of the colloids and particles less than about 0.2 mm are removed.

The peat fibre consistency of the suspension leaving the apparatus is at a maximum about 2 percent by weight, and the suspension now has a character such as to be able to be conducted to and be taken up on a take-up device having a conventional take-up filter, where the peat fibre consistency can be increased in a simple manner to about 10 percent by weight, and at least 75 percent of the remaining colloids and particles less than about 0.2 mm are carried away with the draining water. The accept obtained by mechanical drainage may easily have imparted to it a peat fibre consistency of about 40 to 45 percent by weight without any supply of heat and is therefore extremely suitable for use as a cheap peat material for forming the sheets here concerned.

In order to impart to the seed carrier high strength properties also when dry, it has incorporated therein a fibre material, such as cellulosic or mineral fibres, adapted to interconnect the peat fibres.

As a complement or alternative to the fibre-graded peat fibre material, use may be made of a peat material having a degree of humidification of 1 to 3 according to von Post's scale.

It is particularly advantageous from an economical point of view if the interconnecting fibres consist of a cellulose produced from return and/or waste paper.

If besides low material cost a particularly high strength of the dry layer 1 is aimed at then the interconnecting fibres may consist of a cellulose which is produced from pine sulphate or from return and/or waste paper based on pine sulphate.

It may be advantageous from the points of view of economics and of strength that the layer 1 incorporates 60 to 80 (for instance 70) percent by weight of peat material and 20 to 40 (for instance 30) percent by weight of interconnecting fibres.

The seed carrier 1 functions as a carrier of the seeds and can be transported in the form of sheets or rolls to the cultivation area and be laid or rolled out on this area. The seeds are well protected during transport and the planting will be accurate and can be effected in a rapid and extremely simple manner, even over very large areas.

The layer 1 is produced in principle by mixing the peat fibre in a wet state with the interconnecting fibres, and subsequently supplying the mixture to the forming wire of a wire-machine, the latter being, for instance, a conventional papermaking machine, and supplying the seeds before the fibre mixture will reach a dryer section of the machine.

The seeds may be supplied either before or in conjunction with the fibre-mixing operation. This method may suitably be restored to when producing the layer in a Fourdrinier paper machine comprising a headbox.

As an alternative, the seeds may be added after the fibre mixture, for instance between two or more layers which are put together. This method may suitably be practiced when producing the layer on a Fourdrinier paper machine having more than one headbox, or on a so-called sieve machine.

The seeds can be baked directly into the stock suspension so as to form one single layer 1A. One-, two- or multilayered seed carriers can be produced by putting together the layers in the papermaking machine. The latter process is particularly suitable when it is desired to dispose the seeds with predetermined distances between plants and between rows.

By using a peat material fibre-graded in the manner described and from which the colloids and particles less than 0.2 mm have been sorted out, the seed carrier can be produced at a low energy consumption for drying, whereby it will be economically defendable to produce the seed carrier on a large scale and at a high rapidity of production on papermaking machines, without any risk of the seeds being subject to pasteurization caused by a too high drying temperature.

Since machines comprising rotary forming wires or belts, such as papermaking machines, are generally known to those skilled in the art, as is their function, the machine has not been described or illustrated in detail. Multi-layer units may be advantageously produced on said machines according to previously known paperlining principles.

Figure 1:
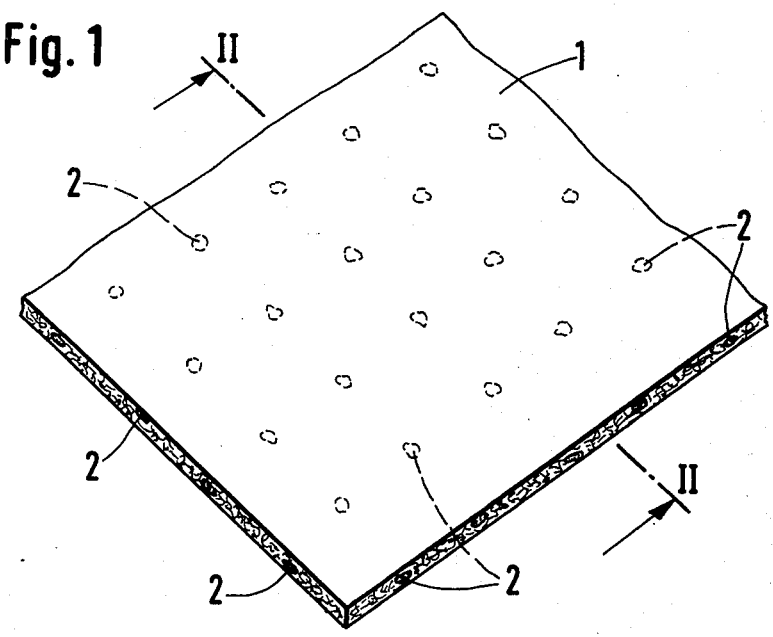
FIG. 1 is a perspective view illustrating a seed carrier according to the invention in the form of a sheet.
Figure 2:
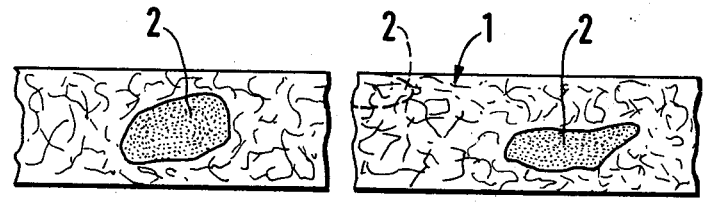
FIG. 2 is an enlarged section taken along the lines II—II in FIG. 1.
Figure 3:
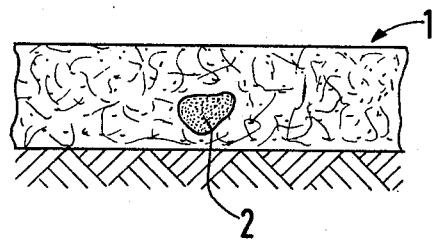
FIGS. 3 and 4 illustrate a section through a seed carrier in the form of a sheet disposed on the ground and containing seeds in different states of germination.
Figure 4:
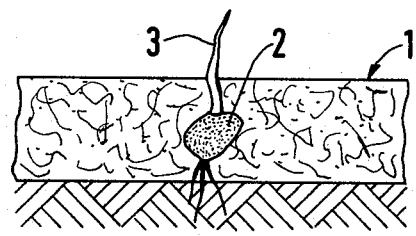
Figure 5:
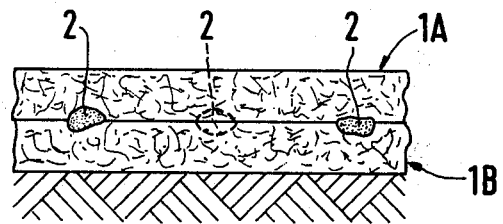
FIG. 5 is a section through a seed carrier consisting of two layers with seeds disposed in the interface between the layers.

After laying out the layer 1 on the area to be cultivated the area is irrigated, whereby the seeds 2 will start germination. In so doing the plant 3 penetrates the layer 1A (see FIG. 4); after harvest the seed carrier is preferably left in place to serve as a soil improvement material.

The description hereinbefore and the drawings are intended to explain and not to restrict the inventive principle the details of which may vary within the scope of the appended claims. Thus for example the seed carriers may incorporate various additives, for instance for promoting the rapidity of growth, such as fertilizer or the like.

The seed carrier 1 suitably consists of unsized material, but it may be provided with at least one layer (not shown) of sized material. The sized material layer may be arranged as a covering layer and may be intended, inter alia, as a strenthening layer and may be provided with perforations through which the plant can grow up. The color of the covering layer may be light or dark depending on the climate in the districts where the element is to be used.

The advantages of the seed carrier according to the invention may be summarized as follows:

1. The seed carrier may be produced in a continuous process and with a high dry-substance percentage, varying thickness and varying bulk without any damage to the seeds;
2. The seed carrier will obtain paper-like properties, which is advantageous from the points of view of production, transportation and handling;
3. Reinforcement is obtained to increase the strength of the seed carrier during its production;
4. The seed carrier, when wetted, will be sufficiently porous to let through the plant, but will resume an essentially more rigid condition upon drying, so as, in its dried condition, to form an excellent transpiration blockage;
5. It is possible to produce a multi-layer unit consisting of a plurality of layers by the application of a conventional paper-lining method in conventional paper-lining machines.
6. It is possible in a conventional paper-lining method making use of at least three layers, to dispose seeds and fertilizer according to a controlled pattern;
7. Any selected layer of the seed carrier can be made thin for carrying small seeds or thick for carrying large seeds;
8. The seed carrier forms a blanket which is extremely moisture-conserving for the underlying soil, so that it is highly suitable for use in cultivation of dry districts, for instance desert regions.

Von Post's scale referred to above is described in a Ground Planning Report: "Torv i Sverige, 1977:1 (Peat in Sweden, 1977:1)" a planning report elaborated by "Nämnden för Energiproduktion:s planeringsgrupp f/UMl/o/ r torv (Commission for Energy Production—Planning Group for Peat)".

What is claimed is:

1. A peat-containing seed carrier produced in a machine comprising at least one rotating endless forming element and comprising at least 60 percent by weight of a peat material which has been subjected to an operation of adding water to raw peat material to bring the actual peat fibre concentration to less than about 1 percent by weight and which has been subjected to a classifying operation by which colloids and particles less than about 0.2 mm are separated out to provide a graded peat fibre material and comprising 40 percent by weight of another fibre material interconnecting the peat fibres.

2. A seed carrier according to claim 1 further comprising, in addition to said graded peat fibre material, a peat fibre material having a degree of humidification of 1 to 3 according to von Post's scale.

3. A seed carrier according to claim 1, wherein said endless forming element is a wire.

4. A seed carrier according to claim 1, wherein said endless forming element is a belt.

5. A seed carrier according to claim 1, wherein said endless forming element is part of a machine of the type used for papermaking.

6. A seed carrier according to claim 1, wherein said interconnecting fibre material comprises mineral fibres.

7. A seed carrier according to claim 1, wherein said interconnecting fibre material comprises cellulose fibres.

8. A seed carrier according to claim 7, wherein the interconnecting fibre material consists of cellulose produced from return paper.

9. A seed carrier according to claim 7, wherein the interconnecting fibre material consists of cellulose produced from pine sulphate.

10. A seed carrier according to claim 7, wherein the interconnecting fibre material consists of cellulose produced from return paper based on pine sulphate.

11. A seed carrier according to claim 1 comprising 60 to 80 percent by weight of peat material and 20 to 40 percent by weight of interconnecting fibre material.

12. A peat-containing seed carrier produced in a machine comprising at least one rotating endless forming element and comprising at least 60 percent by weight of a peat material having a degree of humidification of 1 to 3 according to von Post's scale, and comprising at most 40 percent by weight of a fibre material other than said peat material interconnecting the peat fibres.

13. A method of producing a peat-containing seed carrier on a machine comprising at least one rotating endless forming element and having a drying section comprising the steps of:
 (a) adding water to raw peat material to obtain a peat fibre suspension having a peat fibre concentration of less than 1 percent by weight;
 (b) feeding the peat fibre suspension to a classifying device;
 (c) classifying the peat fibre suspension by separating therefrom a portion of colloids and particles of less than 0.2 mm in size;
 (d) wet mixing another fibre material with the peat material to interconnect the peat fibres and to form a mixture;
 (e) thereafter supplying the mixture to the forming element of the forming machine;
 (f) adding seeds to the peat fibre material before the mixture reaches a drying section of the machine; and
 (g) thereafter drying the mixture to provide a seed carrier.

14. A method according to claim 13 including, prior to said wet mixing step, the additional step of providing a raw peat fibre material having a degree of humidification of from 1 to 3 according to von Post's scale.

15. A method according to claim 13, wherein said endless forming element is a wire.

16. A method according to claim 13, wherein said endless forming element is a belt.

17. A method according to claim 13, wherein said machine is of the type used for papermaking.

18. A method according to claim 13, wherein said classifying step includes a fine grading step performed on the peat fibre suspension.

19. A method according to claim 18, wherein said fine grading step includes a step of treating the peat fibre suspension with an apparatus which includes a screening member having through-flow apertures of about 1 mm or less in diameter.

20. A method according to claim 13, wherein the seeds are added to the peat material before the step of mixing the fibres.

21. A method according to claim 13, wherein the seeds are added to the peat material in conjunction with the step of mixing the fibres.

22. The method according to claim 13, wherein the seeds are added to the peat material after the step of mixing the fibres.

23. A method of producing a peat-containing seed carrier to be produced on a machine comprising at least one rotating endless forming element and having a drying section comprising the steps of:
 (a) providing a raw peat fibre material having a degree of humidification of from 1 to 3 according to von Post's scale;
 (b) wet mixing another fibre material with the peat material to interconnect the peat fibres and to form a mixture;
 (c) thereafter supplying the mixture to the forming element of the forming machine;
 (d) adding seeds to the peat fibre material before the mixture reaches a drying section of the machine; and
 (e) thereafter drying the mixture to provide a seed carrier.

* * * * *